July 28, 1970 R. D. POULSEN 3,521,665
GATE VALVE
Filed May 9, 1968 2 Sheets-Sheet 1
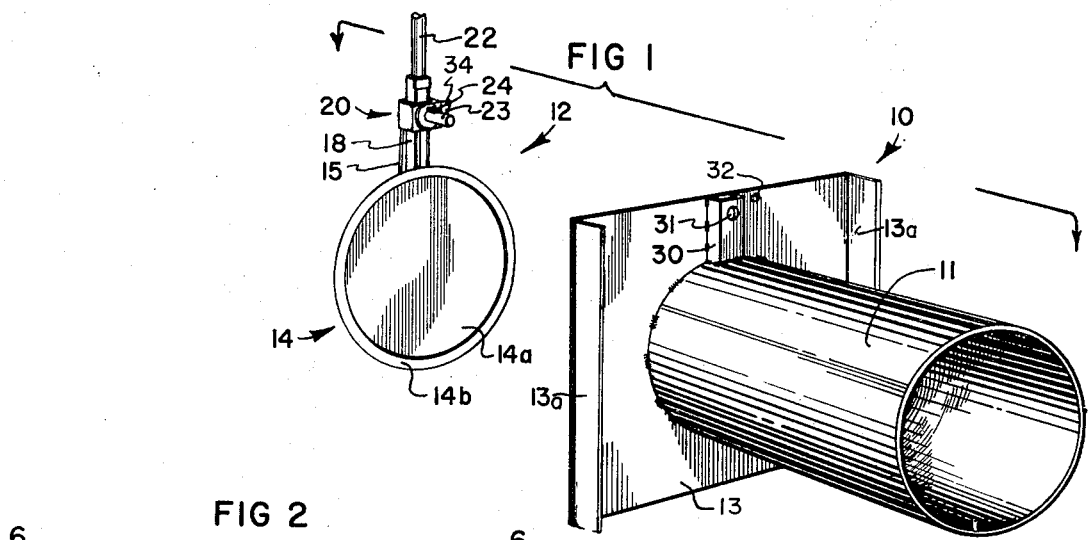
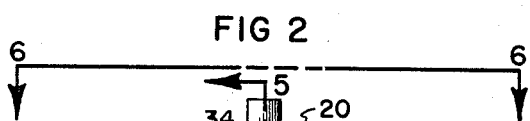
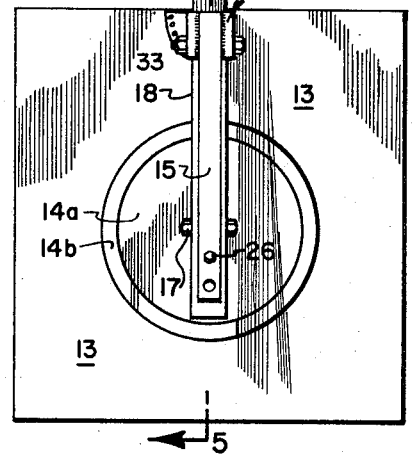
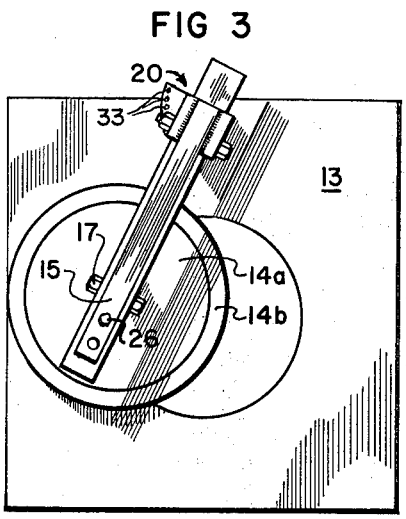
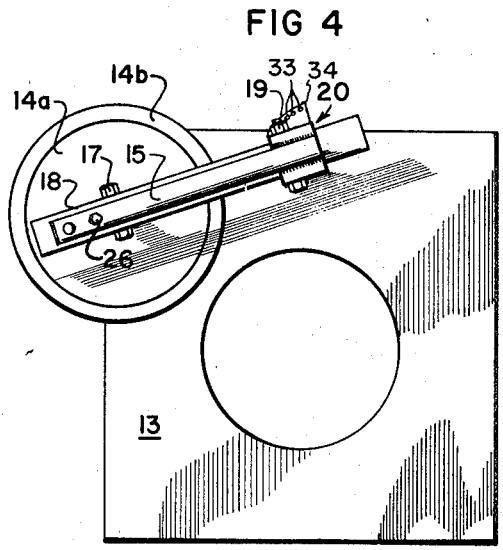
INVENTOR:
RONALD D. POULSEN
BY:
*B. Deon Liddle*
ATTORNEY July 28, 1970 R. D. POULSEN 3,521,665
GATE VALVE
Filed May 9, 1968 2 Sheets-Sheet 2
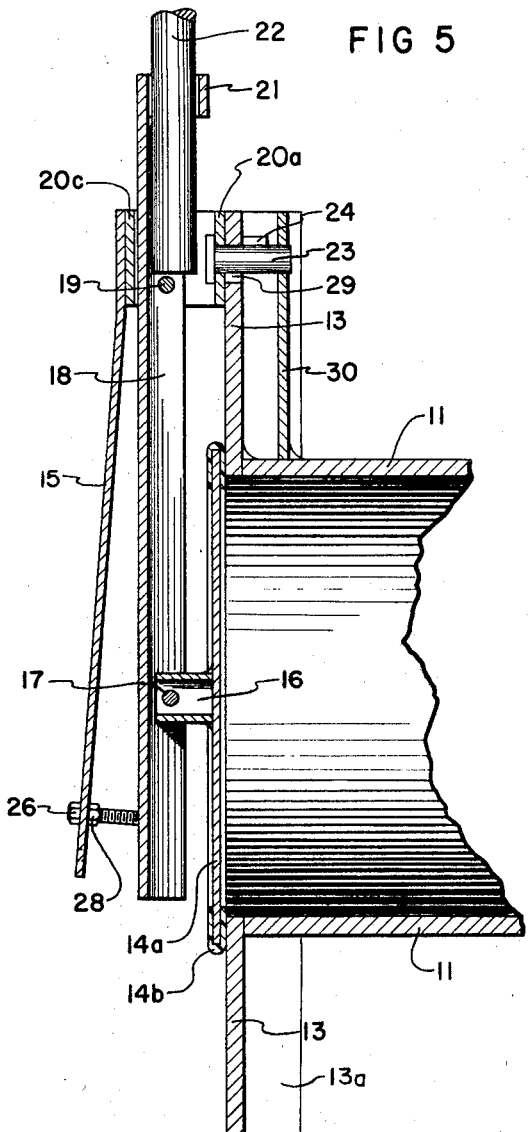
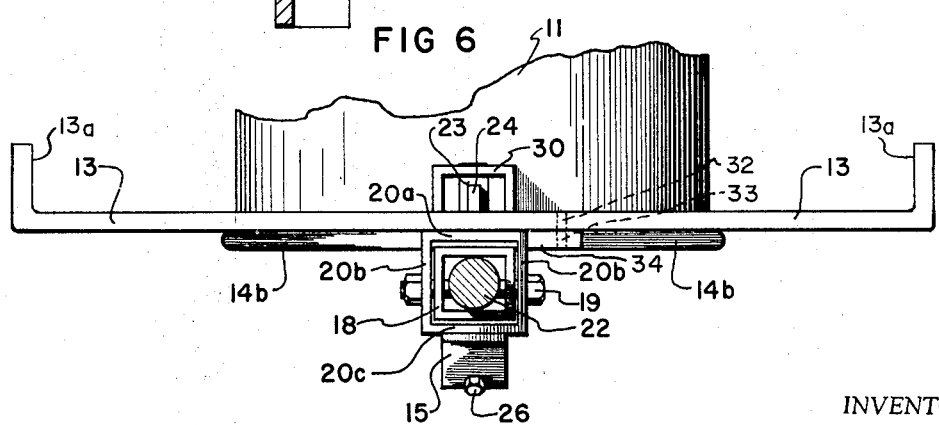
INVENTOR:
RONALD D. POULSEN
BY:
ATTORNEY United States Patent Office 3,521,665
Patented July 28, 1970

3,521,665
GATE VALVE
Ronald D. Poulsen, Rigby, Idaho, assignor to Alden Poulsen, Idaho Falls, Idaho
Filed May 9, 1968, Ser. No. 727,936
Int. Cl. E03b 7/07; F16k 25/00, 35/10
U.S. Cl. 137—383        12 Claims

ABSTRACT OF THE DISCLOSURE

A gate valve comprising an adapter for fitting on the end of a pipe section and a valve head arranged to be carried by the adapter and to be spring biased to positively completely, or partially, close the end of the pipe.

---

There has long been a need for an inexpensive gate-type control valve, for use with irrigation systems that can be adapted for various kinds of pipes. Because of this need, there have in the past, been many different types of gate valves developed. Some have been adjustable for partial opening and some have been constructed to have only two positions, i.e. either fully open or fully closed. Those with which I am familiar that have been adjustable to partially open positions either have not provided an effective seal or they have been too expensive to be widely accepted. These have generally involved a screw-type actuating mechanism or some other equally expensive operating mechanism that cannot be quickly and easily operated. In addition, most of the control valves with which I am familiar have required the construction of a special concrete, steel or wood diversion box in which they can be mounted, and many have upstanding fittings and operating mechanisms that provide obstructions to the normal working of farm machinery.

Principal objects of the present invention are to provide a control valve that is inexpensive to construct and one that can be easily and quickly set to any desired degree of opening to effectively regulate flow through the valve.

The settings of most control valves heretofore and presently used have also been easily changed by anyone—and, as a result, a farmer may have set his valve and left, only to return later and find that someone tampered with the setting.

Thus, it is another object of this invention to provide a control valve that can be easily set for desired water control by an owner, but that is not so easily set by others.

Still another object is to provide a control valve that can, with but minor modification, be used to regulate flow through virtually any size irrigation pipe.

Principal features of my invention are an adapter constructed to be mounted on any conventional type of pipe and to prevent erosion or washout around the pipe, and a valve mechanism, including a replaceable valve head that is adapted to seal against the end of the pipe adapted to be easily connected to the adapter plate. A leaf spring biases a seal plate and seal of the valve head against the seat formed by the pipe end with an adjustable pressure, and a removable handle is used to set the valve, in opposition to the biasing action of the spring.

Additional objects and features of the invention will become apparent from the following detailed description and drawings, disclosing what is presently contemplated as being the best mode of the invention.

THE DRAWINGS

FIG. 1 is a perspective view of the invention showing a typical pipe section on which it is to be mounted;

FIG. 2 is a front elevation view of the invention, mounted on the end of the pipe section and with the valve head completely closing the opening through the adapter;

FIG. 3, a view like FIG. 2, but with the valve head partially closing the opening;

FIG. 4, a view like FIGS. 2 and 3, with the valve head moved completely away from the opening;

FIG. 5, a vertical section taken on the line 5—5 of FIG. 2; and

FIG. 6, a top plan view of the invention, as shown in FIG. 2.

DETAILED DESCRIPTION

Referring now to the drawings:

In the illustrated embodiment, an adapter, shown generally at 10, is arranged to fit around the end of a section of pipe 11 and to removably receive a valve assembly, shown generally at 12.

The adapter 10 includes a plate 13 with a hole therethrough large enough to allow relatively free flow from or to pipe 11, and bent wings 13a. The end of the pipe is abutted to one face of plate 13 and the pipe then extends from the plate to fit into a ditch into which irrigation water is to be admitted through the valve. The plate 13 is shown as being welded to steel pipe 11 such that a complete seal is provided between them. However, pipe sections of other materials, such as concrete or fiberglass could be used and that the pipe and plate 13 can be connected in any conventional means i.e. by a clamping collar and a gasket, so long as a rigid, sealed connection is provided. The wings 13a, which may be any desired length, extend into a ditch bank to stabilize the pipe and valve assembly against transverse movement and to more effectively provide a barrier to water seepage around the pipe and valve assembly.

A valve head 14, comprising a seal plate 14a adapted to fit against and slightly overlap the end of the pipe 11 and a peripheral, resilient seal member 14b that fits around the periphery of plate 14a to seat against both the end of the pipe and the portion of plate 13 immediately surrounding the pipes, is mounted to be spring biased, by a leaf spring 15, toward the pipe and plate 13. The resilient material from which the seal member 14b is constructed conforms to irregularities in the end of the pipe and between the pipe and plate 13 to form a gasket-tight seal.

A projecting stem 16, FIG. 5, having one end fixed to the center of seal plate 14a, by welding, or otherwise, on the side opposite the face of the seal plate which is adapted to seal against the pipe and plate 13 has its other end pivotally connected by a pivot pin 17 passed therethrough to an arm 18, at a point near one end of the arm. Intermediate its length, but closer to the other end of arm 18, the arm is pivotally connected by a pin 19 passed therethrough to a support collar shown generally at 20.

As illustrated, arm 18 is made of a channel member, with pins 17 and 19, which may be bolts, passed through the legs of the channel member and with another section of channel 21 welded thereto at the end opposite the valve head, to form a prying surface for a removable operating handle 22, to be more fully described.

Support collar 20 is of generally box-like configuration, open at the top and the bottom to allow the arm 18 to extend therethrough. A pin 23, having a key 24 formed on the top of the shank thereof, is fixed to and projects rearwardly from a rear wall 20a of the collar 20. Pivot pin 19 extends between opposing side walls 20b of collar 20 and spring 15 has one end fixed to the exterior of a front wall 20c. A bolt 26 extends through a hole 27 in the other end of the spring 15 and has a nut 28 threaded thereon. The threaded end of the bolt 26 engages arm 18 and the pressure applied by the spring to the arm can be varied by threading nut 28 along bolt 26, to thereby vary the flexure in the spring. If desired, a lock nut (not shown) can be used in conventional fashion to secure nut 28 in its set position. Obviously, the flexure adjustment could as well be fixed to the valve head and adjustably protrude therefrom into engagement with the spring. Other adjustment arrangements could also be used.

In use, the adapter 10 is fastened to pipe section 11 such that plate 13 is flush with the end of the pipe.

The valve assembly, comprising support collar 20, arm 18, spring 15, and valve head 14 is fastened to plate 13 by turning it upside down so that key 24 will pass through a depending elongated portion of a keyhole slot 29 through plate 13. Thereafter the valve assembly is rotated until key 24 acts against the back of plate 13 to secure the valve assembly against removal from the plate 13, until the valve assembly has again been fully rotated to align key 24 with the elongate portion of keyhole slot 29. A brace 30 having a hole 31 therein, may, if desired, be provided behind the keyhole slot 29, and may be rigidly connected between plate 13 and the pipe section 11. The end of pin 23 can then be inserted into and through hole 31 to assist in holding the valve assembly against twisting. Other braces, not shown, can also be provided between the plate 13 and pipe section 11, as desired. Since spring 15 will act to strongly bias the valve head beyond the end of the pipe, it is necessary to use the long, removable handle 22 to provide the leverage necessary to overcome the biasing force and to move the valve head into engagement with the end of the pipe. Handle 22 is inserted into the enclosure formed by the legs of the channel member comprising arm 18 and the legs of channel section 21, until it rests on pin 19, and is then pivoted against channel section 21 and toward the web of channel piece 21 to pry the end of arm 18 carrying valve head 14 away from the end of the pipe. When the spring biasing force acting on arm 18 has been thus overcome, the handle can be rotated to pivot the valve head, utilizing pin 23 as the rotative axis. The valve head can then be positioned to close the pipe entirely or to partially close the end of the pipe, as desired. When the handle 22 is released, spring 15 will force the valve head against the end of the pipe to hold it tightly in its set position.

The handle is removed to prevent unauthorized resetting of the valve head and to eliminate upstanding structure that could damage farm equipment such as harvesting machines. While it is possible to move the valve head without using a handle, and it is also possible to use a stick or other such member as a substitute handle, a substitute handle of suitable size will most often not be readily available, and because the arm 18 extends only a short distance above pin 19, it does not provide a long enough leverage arm to allow easy movement of the valve head in opposition to the bias of spring 15 which acts on the arm 18 a much greater distance from the pivot pin 19. Furthermore, although not shown, a conventional padlock, having its hasp inserted through a hole 32, plate 13, and one of a number of holes 33 in a lock member 34 fixed to and rotatable with arm 18 can be used to even more securely lock the valve assembly to the adapter and the valve in its set position.

The adapter 10 is readily installed on any pipe section and only the size opening in various ones of the adapters through which the pipe is inserted must be varied to allow the adapter to fit a particular pipe. A relatively small stock of adapters will thus insure proper fit of all standard size pipes.

All components of the valve assembly, except the valve head, can be the same for each installation, since the keyhole slot 29 can be located a uniform distance from the center of the pipe opening and the lengths of arm 18 and spring 15 do not need to vary. Naturally, however, since the seal plate 14a of any particular valve head will not close the openings of all sized pipes, a plate selected to fit the pipe must be used for each installation. The seal plate 14a is easily changed, merely by removing pivot pin 17, changing the plate and reinserting the pin.

The valve is economical to construct, can be used to fully close or partially close the end of a pipe and is easily installed. The adapter plate 13 projects outwardly from the pipe to be solidly embedded in a ditch bank, or the like, and prevents the pipe and valve from being washed out by erosion of soil from around the pipe.

I claim:

1. A control valve for use in irrigation systems and the like, comprising:
   an adapter plate having an opening therethrough adapted to form a continuation of the interior of a section of pipe; and
   a valve assembly, including a valve head comprising a seal plate, a seal thereon extending around the plate and adapted to seal against the adapter plate, around the opening, means pivotally mounting the seal plate to be swung into and out of engagement with the adapter plate, spring means adapted to bias said seal plate into engagement with the adapter plate, and pivot means mounting the seal plate to be pivoted transversely to the through axis of the opening and the direction of seal plate movement into and out of engagement with the adapter plate;
   means for removably mounting said valve assembly on said adapter plate such that the seal on the seal plate of the valve assembly will surround the opening; and
   means, including a removable handle, for moving said seal plate in opposition to the bias of the said spring means and for pivoting the said seal plate transversely to the axis of the opening.

2. A control valve, as in claim 1, wherein the means mounting the seal plate to be swung into and out of engagement with the adapter comprises:
   a collar having a pivot pin extending thereacross;
   an arm journalled on said pivot pin; and
   means pivotally connecting the arm to the seal plate.

3. A control valve as in claim 2, wherein the spring means adapted to bias the seal plate into engagement with the adapter comprises:
   a leaf spring fixed to the collar; and
   force transmitting means between one end of the spring and the seal plate for acting against the plate and for flexing the said spring.

4. A control valve as in claim 3, wherein the force transmitting means is adjustable such that the length of said means between the spring and the seal plate can be changed to thereby change the flexure of said spring.

5. A control valve as in claim 2, wherein the pivot means mounting the seal plate to be pivoted transversely to the axis of the opening and the direction of seal plate movement comprises:
   a retaining pin fixed to and projecting from the collar;
   a hole in the adapter plate through which the retaining pin is to be inserted; and
   means for releasably holding said retaining pin against withdrawal from the hole.

6. A control valve as in claim 5, wherein the means for releasably holding the retaining pin against withdrawal from the hole provided therefor in the adapter plate comprises:
   a key on the retaining pin; and
   a slot radiating from said hole and through which said key can be inserted, whereby after insertion and rotation of the pin, the key engages the rear of the adapter plate to prevent withdrawal of the pin until the pin has been rotated to align the key with the slot.

7. A control valve, as in claim 2, wherein the means for moving the seal plate in opposition to the bias of the spring means and for pivoting the seal plate transversely to the axis of the pipe comprises:
- a portion of the arm extending past the pivot pin on the side opposite the seal plate; and
- the releasable handle, which is adapted to be connected to the extended part of the arm.

8. A control valve as in claim 7, wherein the spring means adapted to bias the seal plate into engagement with the pipe and adapter plate comprises:
- a leaf spring fixed to the collar; and
- force transmitting means between one end of the spring and the seal plate for acting against the plate and for flexing the said spring.

9. A control valve as in claim 8, wherein the force transmitting means is adjustable, whereby the length of said means between the spring and the seal plate can be changed.

10. A control valve as in claim 9, wherein the pivot means mounting the seal plate to be pivoted transversely to the axis of the pipe and the direction of seal plate movement comprises:
- a retaining pin fixed to and projecting from the collar;
- a hole in the adapter plate through which the retaining pin is inserted;
- means for releasably holding said retaining pin against withdrawal from the hole.

11. A control valve as in claim 10, wherein the means for releasably holding the retaining pin against withdrawal from the hole provided therefor in the adapter plate comprises:
- a key on the retaining pin; and
- a slot radiating from said hole and through which said key can be inserted, whereby after insertion of the pin and rotation of the valve assembly, the key engages the rear of the adapter plate to prevent withdrawal of the pin until the pin has been rotated to align the key with the slot.

12. A control valve as in claim 10, further including:
means for locking the valve assembly to the adapter plate and the valve head in its set position.

References Cited

UNITED STATES PATENTS

| | | | |
|---|---|---|---|
| 483,455 | 9/1892 | Irvin | 251—177 |
| 490,404 | 1/1893 | Smith | 251—179 |
| 540,568 | 6/1895 | Abrahamson | 251—179 XR |
| 1,199,501 | 9/1916 | Sargent | 251—179 XR |

HENRY T. KLINKSIEK, Primary Examiner

U.S. Cl. X.R.

251—158, 179, 300